(12) United States Patent
Salhov et al.

(10) Patent No.: US 8,837,563 B2
(45) Date of Patent: Sep. 16, 2014

(54) SYSTEMS METHODS CIRCUITS AND APPARATUS FOR CALIBRATING WIRELESS COMMUNICATION SYSTEMS

(75) Inventors: Moshe Salhov, Herzeliya (IL); Roy Kinamon, Tel Aviv (IL)

(73) Assignee: Go Net Systems Ltd., Tel Aviv (IL)

( * ) Notice: Subject to any disclaimer, the term of this patent is extended or adjusted under 35 U.S.C. 154(b) by 123 days.

(21) Appl. No.: 13/588,036

(22) Filed: Aug. 17, 2012

(65) Prior Publication Data

US 2013/0208774 A1 Aug. 15, 2013

Related U.S. Application Data

(60) Provisional application No. 61/524,359, filed on Aug. 17, 2011.

(51) Int. Cl.
*H04B 1/38* (2006.01)
*H04B 7/005* (2006.01)
*H04L 25/03* (2006.01)
*H04L 25/02* (2006.01)
*H04B 17/00* (2006.01)

(52) U.S. Cl.
CPC ............ *H04B 7/005* (2013.01); *H04L 25/0228* (2013.01); *H04B 17/0062* (2013.01); *H04B 17/008* (2013.01); *H04B 17/0085* (2013.01); *H04L 25/0206* (2013.01); *H04L 25/03343* (2013.01); *H04B 17/0012* (2013.01)
USPC .......................................................... 375/220

(58) Field of Classification Search
CPC ............... H04B 7/005; H04B 17/0005; H04B 17/0062; H04L 1/0026; H04L 1/02; H04L 25/0224; H04L 25/0228; H03F 1/3247
USPC ......... 375/219–220, 222, 285, 295–296, 316; 455/501, 63.1, 67.11, 67.13, 455/115.1–115.2
See application file for complete search history.

(56) References Cited

U.S. PATENT DOCUMENTS

| | | | |
|---|---|---|---|
| 7,522,555 B2* | 4/2009 | Li et al. ......................... 370/329 |
| 8,099,132 B2* | 1/2012 | Kim et al. ................... 455/562.1 |
| 8,311,166 B2* | 11/2012 | Kenington .................... 375/347 |
| 2005/0140546 A1* | 6/2005 | Park et al. ..................... 342/368 |
| 2006/0019712 A1* | 1/2006 | Choi .......................... 455/562.1 |

* cited by examiner

*Primary Examiner* — Khanh C Tran
(74) *Attorney, Agent, or Firm* — Vladimir Sherman; Professional Patent Solutions

(57) ABSTRACT

Disclosed are wireless communication systems and methods for calibrating same. The communication systems may include first wireless transceivers having: (a) a modem, and (b) one or more Radio Frequency (RF) chain pairs. There may also be included a sounding circuit block. A calibrated switchable bridging block (CSBB) may switchably couple signals between the first transceivers and the sounding circuit block. Calibration control logic may regulate signal flow through said CSBB during a sounding sequence of said first wireless transceiver and may apply compensation coefficients to RF compensation circuits functionally associated with said the wireless transceiver RF chain pairs.

25 Claims, 11 Drawing Sheets

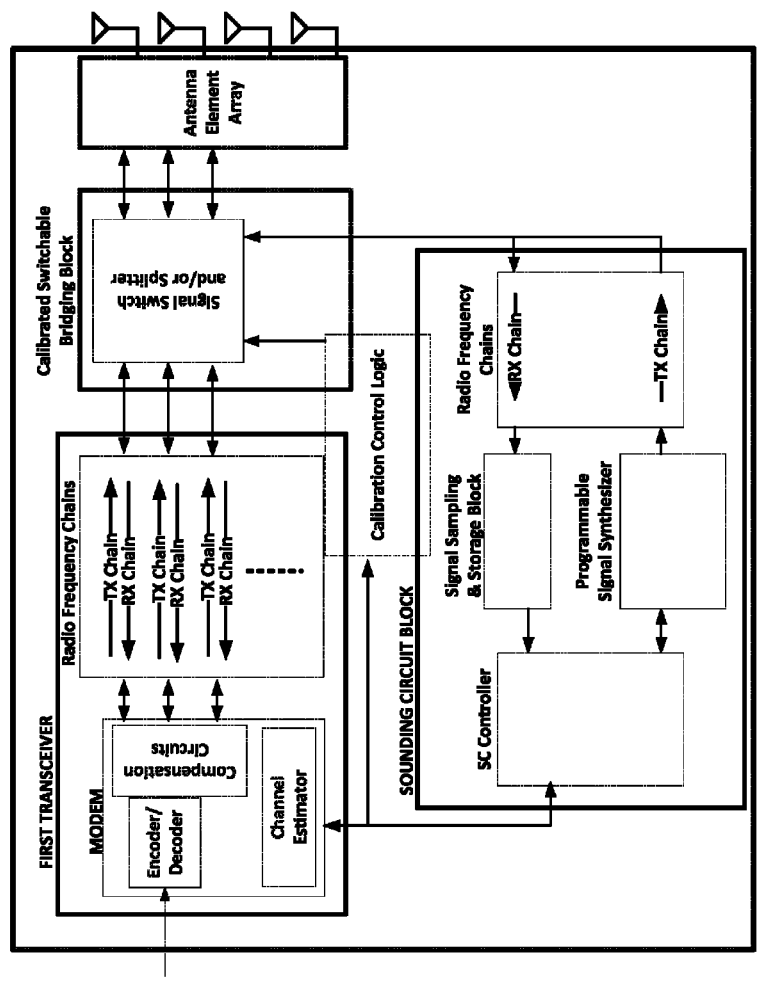

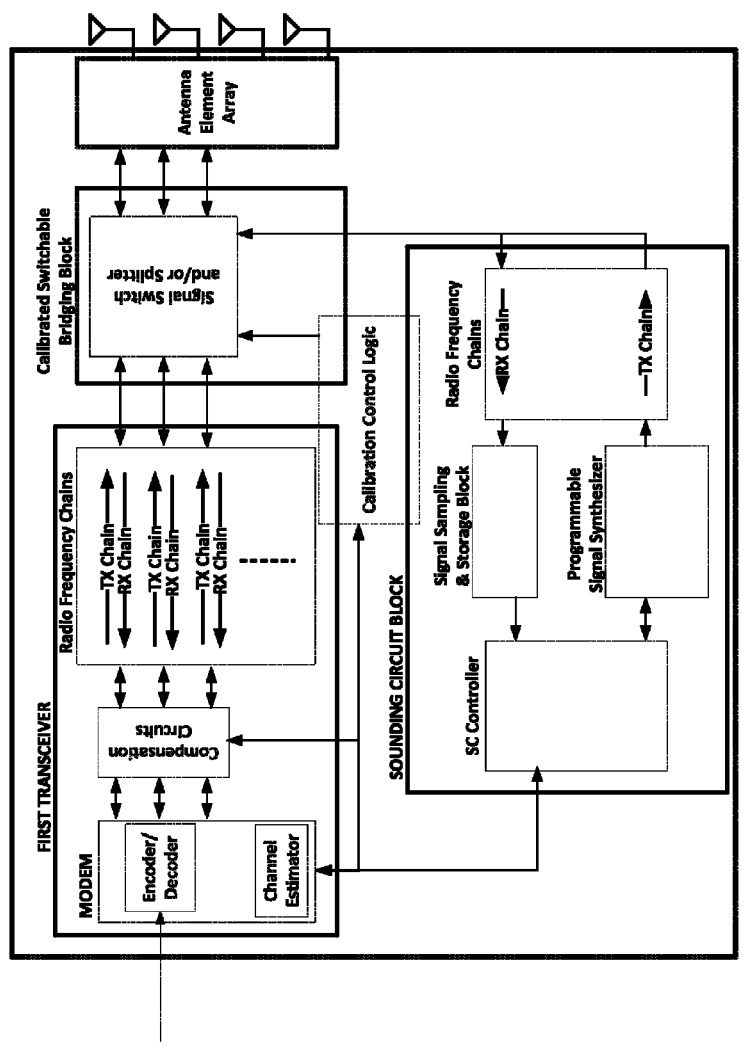
Fig. 1AII

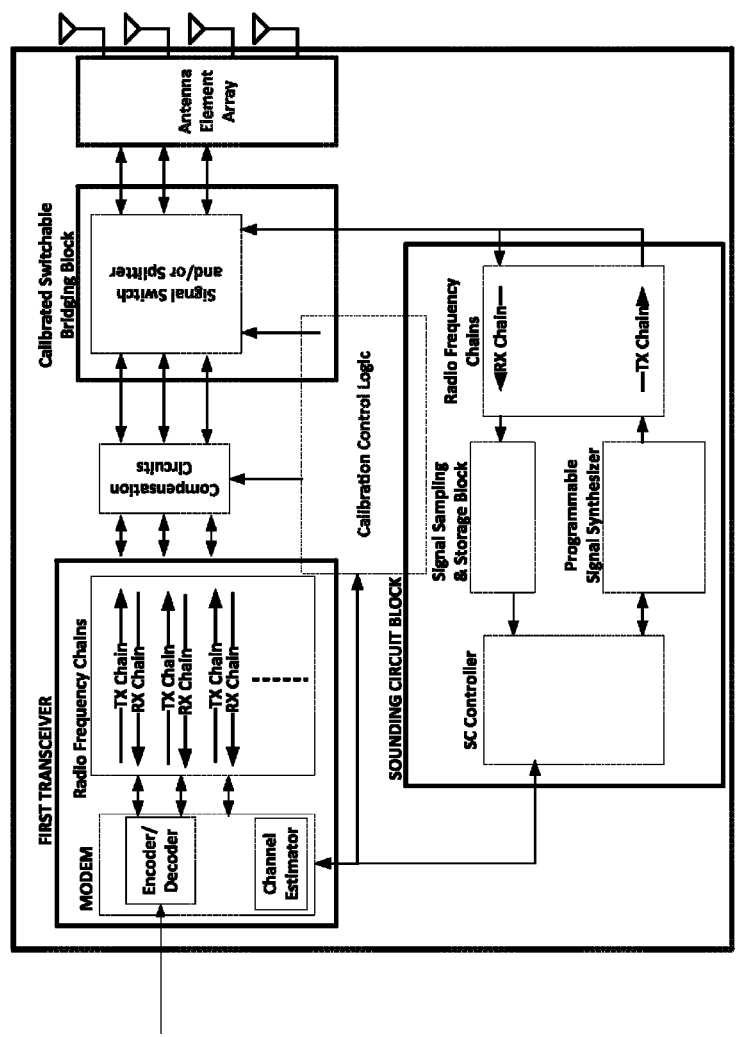
Fig. 1Aiii

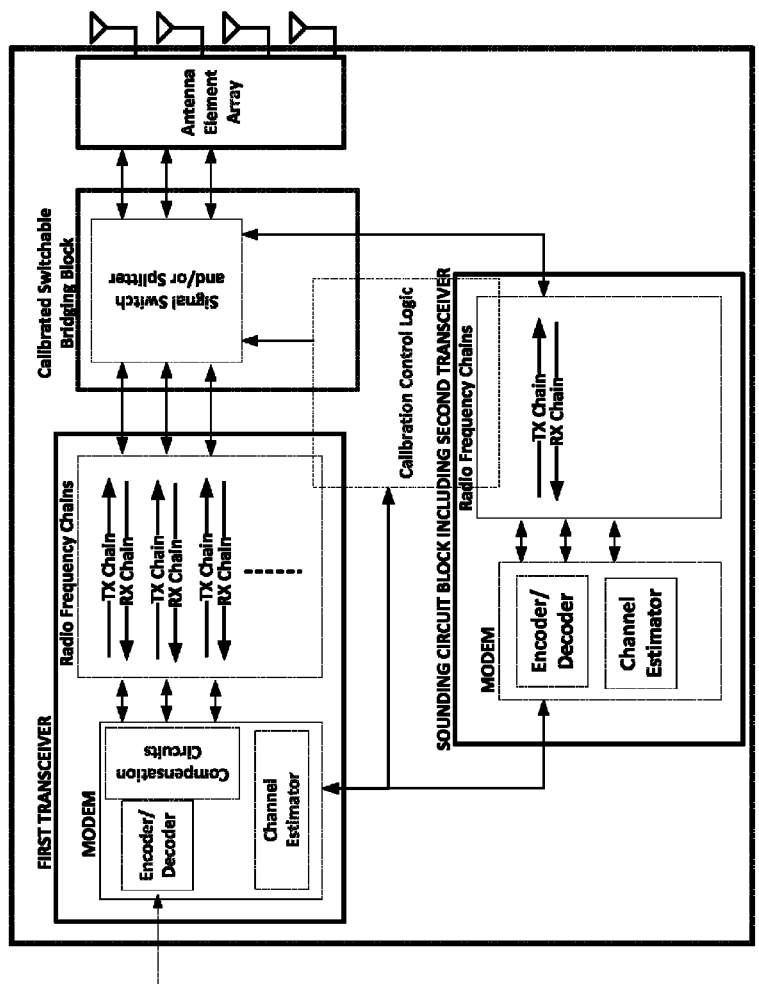

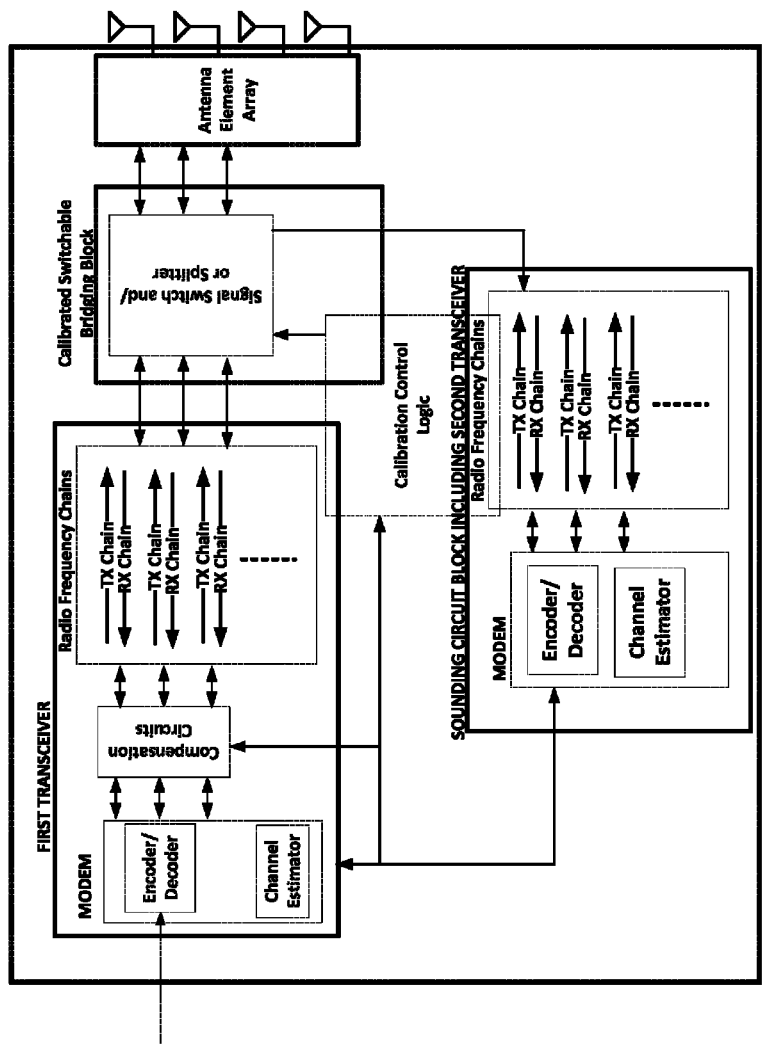
Fig. 2AII

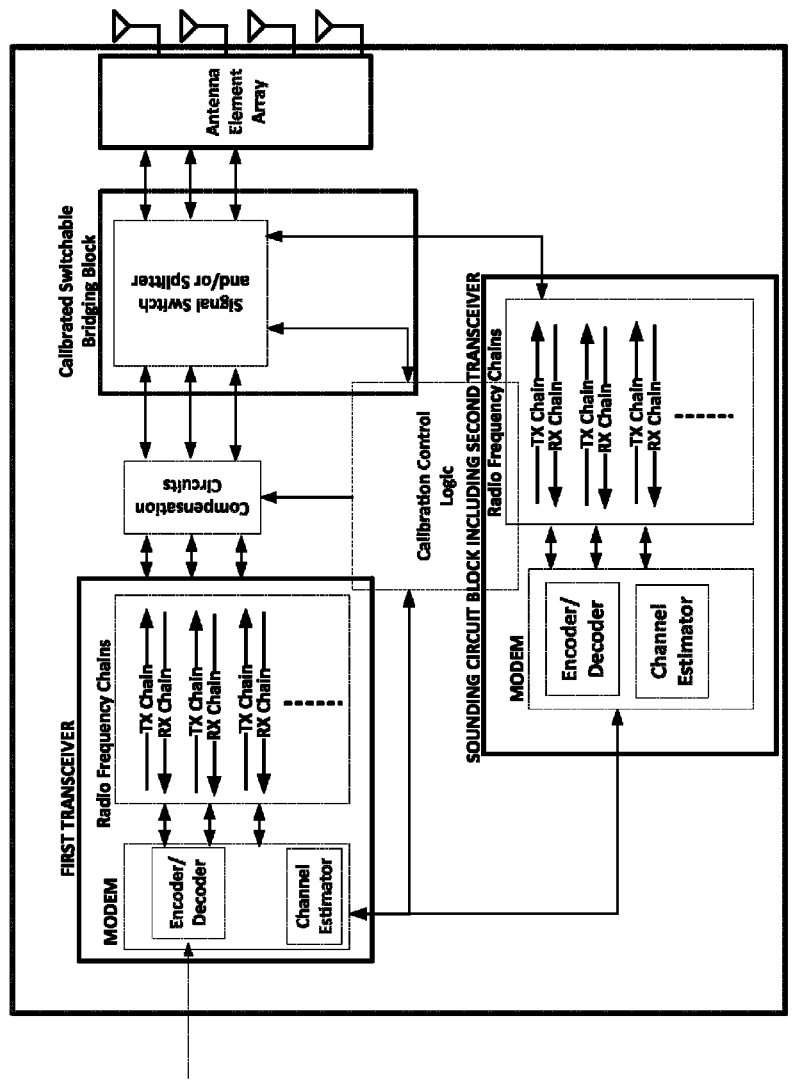

SYSTEMS METHODS CIRCUITS AND APPARATUS FOR CALIBRATING WIRELESS COMMUNICATION SYSTEMS

FIELD OF THE INVENTION

The present invention generally relates to the field of wireless communication and, more particularly, to wireless communications systems and methods, circuits, devices, systems and associated computer executable code for calibrating wireless communication systems.

BACKGROUND

Wireless data communication has rapidly evolved over the past decades since its conception in 1970 by Norman Abramson, who developed the world's first computer communication network, ALOHAnet, using low-cost ham-like radios. With a bi-directional star topology, the ALOHAnet system connected seven computers, deployed over four islands, to communicate with the central computer on the Oahu Island without using phone lines. In 1979, F. R. Gfeller and U. Bapst published a paper in the IEEE Proceedings reporting an experimental wireless local area network using diffused infrared communications. Shortly thereafter, in 1980, P. Ferrert reported on an experimental application of a single code spread spectrum radio for wireless terminal communications in the IEEE National Telecommunications Conference. In 1984, a comparison between infrared and CDMA spread spectrum communications for wireless office information networks was published by Kaveh Pahlavan in IEEE Computer Networking Symposium which appeared later in the IEEE Communication Society Magazine. In May 1985, the efforts of Marcus led the FCC to announce experimental ISM bands for commercial application of spread spectrum technology. Later on, M. Kavehrad reported on an experimental wireless PBX system using code division multiple access. These efforts prompted significant industrial activities in the development of a new generation of wireless local area networks and it updated several old discussions in the portable and mobile radio industry.

The first generation of wireless data modems was developed in the early 1980s by amateur radio operators, who commonly referred to this as packet radio. They added a voice band data communication modem, with data rates below 9600-bit/s, to an existing short distance radio system, typically in the two meter amateur band. The second generation of wireless modems was developed immediately after the FCC announcement in the experimental bands for non-military use of the spread spectrum technology. These modems provided data rates on the order of hundreds of kilobit/s. The third generation of wireless modem then aimed at compatibility with existing LANs with data rates on the order of several Mbit/s. Several companies developed the third generation products with data rates above 1 Mbit/s, and a couple of products had already been announced by the time of the first IEEE Workshop on Wireless LANs.

The first of the IEEE Workshops on Wireless LAN was held in 1991. At that time, early wireless LAN products had just appeared in the market and the IEEE 802.11 committee had just started its activities to develop a standard for wireless LANs. The focus of that first workshop was the evaluation of the various alternative technologies. The IEEE 802.11 standard and variants and alternatives, such as the wireless LAN interoperability forum and the European HiperLAN specification made rapid progress, and the unlicensed PCS Unlicensed Personal Communications Services and the proposed SUPERNet bands also presented new opportunities.

IEEE 802.11 is a set of standards for carrying out wireless local area network (WLAN) computer communication in the 2.4, 3.6 and 5 GHz frequency bands. They were created and maintained by the IEEE LAN/MAN Standards Committee (IEEE 802). The 802.11 family includes over-the-air modulation techniques that use the same basic protocol. The most popular are those defined by the 802.11b and 802.11g protocols, which are amendments to the 802.11-1997 for the first wireless networking standard, but 802.11b was the first widely accepted one, followed by 802.11g and later 802.11n. Security was originally purposefully weak due to export requirements of some governments, and was later enhanced.

As a means of extending range and improving data throughput of wireless communication systems, such as those defined under the 802 standards, beam-forming techniques and MIMO circuits have been integrated with or applied to the output of wireless transmitters. Beam-forming takes advantage of directionality of an antenna array. When transmitting, a beam-former controls the phase and relative amplitude of the signal at each antenna, in order to create a pattern of constructive and destructive interference in the wavefront. When receiving, information from different sensors/antennas is combined in such a way that the expected pattern of radiation is preferentially observed. MIMO refers to "multiple-input and multiple-output"—a technology which uses multiple antennas at both the transmitter and receiver to improve communication performance. MIMO is one of several forms of smart/adaptive antenna technologies, and may be subdivided into three main categories, pre-coding, spatial multiplexing or SM, and diversity coding:

Pre-coding is multi-layer beam-forming in the narrowest definition. In more general terms, it is considered to be all spatial processing that occurs at the transmitter. In (single-layer) beam-forming, the same signal is emitted from each of the transmit antennas with appropriate phase (and sometimes gain) weighting such that the signal power is maximized at the receiver input. The benefits of beam-forming are to increase the signal gain using constructive interference and to reduce the multipath fading effect. In the absence of scattering, beam-forming results in a well-defined directional pattern, but in typical cellular conventional beams are not a good analogy. When the receiver has multiple antennas, the transmit beam-forming cannot simultaneously maximize the signal level at all of the receive antennas, and precoding is used.

Spatial multiplexing requires MIMO antenna configuration. In spatial multiplexing, a high rate signal is split into multiple lower rate streams and each stream is transmitted from a different transmit antenna in the same frequency channel. If these signals arrive at the receiver antenna array with sufficiently different spatial signatures, the receiver can separate these streams, creating parallel channels. Spatial multiplexing is a very powerful technique for increasing channel capacity at higher signal-to-noise ratios (SNR). The maximum number of spatial streams is limited by the lesser in the number of antennas at the transmitter or at the receiver. Spatial multiplexing can be used with or without transmit channel knowledge.

Diversity Coding techniques are used when there is no channel knowledge at the transmitter. In diversity methods a single stream (unlike multiple streams in spatial multiplexing) is transmitted, but the signal is coded using techniques called space-time coding. The signal is emitted from each of the transmit antennas with full or near orthogonal coding. Diversity coding exploits the independent fading in the multiple antenna links to enhance signal diversity. Spatial multiplexing can also be combined with pre-coding when the channel is known at the transmitter or combined with diversity coding when decoding reliability is in trade-off.

A transmitter, a receiver or a transceiver communicating using either single or multiple streams through multiple antenna elements (e.g. MIMO) may require multiple transmission/reception (TX/RX) chains. Both TX and RX chain are be composed of a series of circuits and/or circuit elements and may be characterized by different channel characteristics. Adjustment and/or tuning (e.g. calibration) of one or more circuits/elements of the one or more TX chains may be required in order to calibrate (e.g. equalize channel characteristics) the transceiver such that proper and efficient operation (e.g. accurate beam forming) may be achieved. The same may be true with regard to Receive (RX) Chains. Additionally, TX/RX chain element characteristics may change over time and/or due to environmental conditions during operation. Adjustment or calibration of specific elements in a TX or RX chain may not be possible during communication system operation. Compensation or equalization for TX/RX chain channel characteristics, and deviations thereof, may be achieved using a signal processing block adapted to perform compensation (e.g. pre-distortion) of signals entering and/or leaving the TX or RX chains. In order to perform such compensation, however, channel characteristics of the TX/RX chains need to be measured and/or estimated.

There remain needs in the field of wireless communication for improved methods, circuits, devices, systems and associated computer executable code for calibrating wireless communication systems.

SUMMARY OF INVENTION

The present invention includes wireless communications systems and methods, circuits, devices, systems and associated computer executable code for calibrating wireless communication systems. According to some embodiments, there is provided a wireless communication system including: (1) one or more antenna elements; (2) a first wireless transceiver having: (a) a modem, and (b) one or more Radio Frequency (RF) chain pairs, wherein at least one RF chain pair includes: (i) a receive chain (RX), and (ii) a transmit chain (TX); and (3) a sounding circuit block having: (a) a receive chain (RX), (b) a transmit chain (TX); and control circuitry adapted to coordinate: (1) reception of sounding signals from said first wireless transceiver, and (2) transmission of sounding signals to said first wireless transceiver. There may also be provided a calibrated switchable bridging block (CSBB) switchably coupling signals between said first transceiver and said sounding circuit block, said CSBB including a controllable signal switch having known channel characteristics between ports of said switch. Calibration control logic integral or otherwise functionally associated with the system may regulate switching and signal flow through said CSBB during one or more sounding sequences (e.g. RX chain sounding sequence and TX chain sounding sequence) of said first wireless transceiver and may apply compensation coefficients derived from the one or more sounding sequences to RF compensation circuits functionally associated with said first wireless transceiver RF chain pairs.

According to some embodiments, one or more sounding signals produced by the first transceiver are conveyed through the CSBB to the sounding circuit block. Channel characteristics of the first transceiver TX chains may be estimated from first transceiver generated sounding signals. According to further embodiments, one or more sounding signals are produced by the sounding circuit block and conveyed to the first transceiver through the CSBB. Channel characteristics of the first transceiver RX chains may be estimated from sounding circuit block generated sounding signals. Channel estimation calculations for the sounding circuit block generated sounding signals may be performed by a channel estimator of the first wireless transceiver. Channel estimation calculations for the first transceiver generated sounding signals may be performed by a channel estimator of the sounding circuit block or by a channel estimator of the first wireless transceiver.

According to some embodiments, the sounding circuit block may include a second wireless transceiver comprising a second transceiver modem. The calibration control logic may be adapted to initiate a TX chain sounding sequence during which: (1) at least one of said first transceiver TX chains is communicatively coupled through said CSBB to the RX chain of said second wireless transceiver; (2) said modem and communicatively coupled TX chains of said first transceiver generate a sounding signal; (3) the coupled RX chain of said second transceiver receives the generated sounding signal; and (4) a channel estimator of said second transceiver modem analyzes the received sounding signal to estimate a channel characteristic of at least a portion of signal paths, including the first transceiver TX chains, between said first transceiver modem and said second transceiver modem. The calibration control logic may be adapted to perform first transceiver TX chain calibration by: (1) calculating TX chain compensation coefficients at least partially based on channel characteristic estimated during the TX chain sounding sequence; and (2) applying the TX chain compensation coefficients to compensation circuits functionally associated with said first transceiver TX chains.

According to further embodiments, the calibration control logic may be adapted to initiate a RX chain sounding sequence during which: (1) at least one of said first transceiver RX chains is communicatively coupled through said CSBB to the TX chain of said second wireless transceiver; (2) said modem and communicatively coupled TX chain of said second transceiver generate a sounding signal; (3) the coupled RX chains of said first transceiver receive the generated sounding signal; and (4) a channel estimator of said first transceiver modem analyzes the received sounding signal to estimate a channel characteristic of at least a portion of signal paths, including the first transceiver RX chains, between said second transceiver modem and said first transceiver modem. The sounding signal generated by said modem and communicatively coupled TX chain of said second transceiver may be a wireless packet with a known signal pattern. The wireless packet may include a payload with estimated channel characteristic of at least a portion of signal paths, including the first transceiver TX chains, between said first transceiver modem and said second transceiver modem. According to further embodiments, the calibration control logic may be adapted to perform RX chain calibration by: (1) calculating RX chain compensation coefficients at least partially based on channel characteristics estimated during the RX chain sounding sequence; and (2) applying the RX chain compensation coefficients to compensation circuits functionally associated with said first transceiver RX chains.

According to some embodiments, the sounding circuit block may be comprised of signal sampling and storage circuits and a signal synthesizer. Calibration control logic may be adapted to initiate a RX chain sounding sequence during which: (1) at least one of said first transceiver RX chains is communicatively coupled through said CSBB to the TX chain of said sounding circuit block; (2) a synthesizer and the communicatively coupled TX chain of said signal sounding block generate a sounding signal including a known pattern;

(3) the coupled RX chains of said first transceiver receive the generated sounding signal; and (4) a channel estimator of said first transceiver modem analyzes the received sounding signal to estimate channel characteristics of at least a portion of signal paths, including the first transceiver RX chains, between of the signal sounding block synthesizer and said first transceiver modem. The calibration control logic may be adapted to perform RX chain calibration by: (1) calculating RX chain compensation coefficients at least partially based on channel characteristics estimated during the RX chain sounding sequence; and (2) applying the RX chain compensation coefficients to compensation circuits functionally associated with said first transceiver RX chains.

According to further embodiments, the calibration control logic may be adapted to initiate a TX chain sounding sequence during which: (1) at least one of said first transceiver TX chains is communicatively coupled through said CSBB to the RX chain of said sounding circuit block; (2) said modem and communicatively coupled TX chains of said first transceiver generate a sounding signal; (3) the coupled RX chain of said sounding circuit block receives the generated sounding signal; (4) the received sounding signal is sampled and stored by a signal sampling and storage block; (5) upon the TX chain of said sounding circuit being bridged into RX chains of said first wireless transceiver, a signal synthesizer generates and transmits the stored sounding signal back to said first wireless transceiver; and (6) a channel estimator of said first transceiver modem analyzes the received sounding signal to estimate channel characteristics of at least a portion of signal paths, including the first transceiver TX chains, between said first transceiver modem and said second transceiver modem. The calibration control logic may be adapted to perform TX chain calibration by: (1) calculating TX chain compensation coefficients at least partially based on channel characteristics estimated during the TX chain sounding sequence; and (2) applying the TX chain compensation coefficients to compensation circuits functionally associated with said first transceiver TX chains. Calculating TX chain compensation coefficients at least partially based on channel characteristic estimated during the TX chain sounding sequence may also include factoring channel characteristic estimated during the RX chain sounding sequence.

According to some embodiments, there may be provided a method for calibrating a wireless communication system. The method may include receiving a first sounding signal generated by a first wireless transceiver at a second wireless transceiver, both of which transceivers are integrated within the wireless communication system. The method may include receiving a second sounding signal generated by the second wireless transceiver at a first wireless transceiver, wherein a payload of the second sounding signal includes channel estimations derived from the first sounding signal, thereby providing the first transceiver with channel estimates performed by the second transceiver. The method may include generating compensation coefficients based on channel estimations performed on the second sounding signal and factoring channel estimations performed of the first sounding signal.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1Ai shows a functional block diagram of an exemplary wireless communication system, according to embodiments of the present invention, including: a first wireless transceiver, a calibrated switchable bridging block, a sounding circuit block and calibration control logic which may be wholly discrete or portions of which may be integral with any one of the other constituent components of the system. The embodiment of FIG. 1Ai includes a sounding circuit block having both RX and TX chains, sounding signal sampling and storage circuits and a signal synthesizer. RX/TX chain compensation circuitry is integral with the first transceiver modem;

FIG. 1Aii shows a functional block diagram of another exemplary wireless communication system, according to embodiments of the present invention, including: a first wireless transceiver, a calibrated switchable bridging block, a sounding circuit block and calibration control logic which may be wholly discrete or portions of which may be integral with any one of the other constituent components of the system. The embodiment of FIG. 1Aii includes a sounding circuit block having both RX and TX chains, sounding signal sampling and storage circuits and a signal synthesizer. RX/TX chain compensation circuitry is integral with the first transceiver, between the modem and the RX/TX chains;

FIG. 1Aiii shows a functional block diagram of another exemplary wireless communication system, according to embodiments of the present invention, including: a first wireless transceiver, a calibrated switchable bridging block, a sounding circuit block and calibration control logic which may be wholly discrete or portions of which may be integral with any one of the other constituent components of the system. The embodiment of FIG. 1Aiii includes a sounding circuit block having both RX and TX chains, sounding signal sampling and storage circuits and a signal synthesizer. RX/TX chain compensation circuitry is outside the first transceiver and connected to the RX/TX ports;

FIG. 2Ai shows a functional block diagram of an exemplary wireless communication system, according to embodiments of the present invention, including: a first wireless transceiver, a calibrated switchable bridging block, a sounding circuit block and calibration control logic which may be wholly discrete or portions of which may be integral with any one of the other constituent components of the system. The embodiment of FIG. 2Ai includes a sounding circuit block having both RX and TX chains and a wireless modem with channel estimation circuits. RX/TX chain compensation circuitry is integral with the first transceiver modem;

FIG. 2Aii shows a functional block diagram of another exemplary wireless communication system, according to embodiments of the present invention, including: a first wireless transceiver, a calibrated switchable bridging block, a sounding circuit block and calibration control logic which may be wholly discrete or portions of which may be integral with any one of the other constituent components of the system. The embodiment of FIG. 2Aii includes a sounding circuit block having both RX and TX chains and a wireless modem with channel estimation circuits. RX/TX chain compensation circuitry is integral with the first transceiver, between the modem and the RX/TX chains;

FIG. 2Aiii shows a functional block diagram of another exemplary wireless communication system, according to embodiments of the present invention, including: a first wireless transceiver, a calibrated switchable bridging block, a sounding circuit block and calibration control logic which may be wholly discrete or portions of which may be integral with any one of the other constituent components of the system. The embodiment of FIG. 2Aiii includes a sounding circuit block having both RX and TX chains and a wireless modem with channel estimation circuits. RX/TX chain compensation circuitry is outside the first transceiver and connected to the RX/TX ports;

Figure 1B:
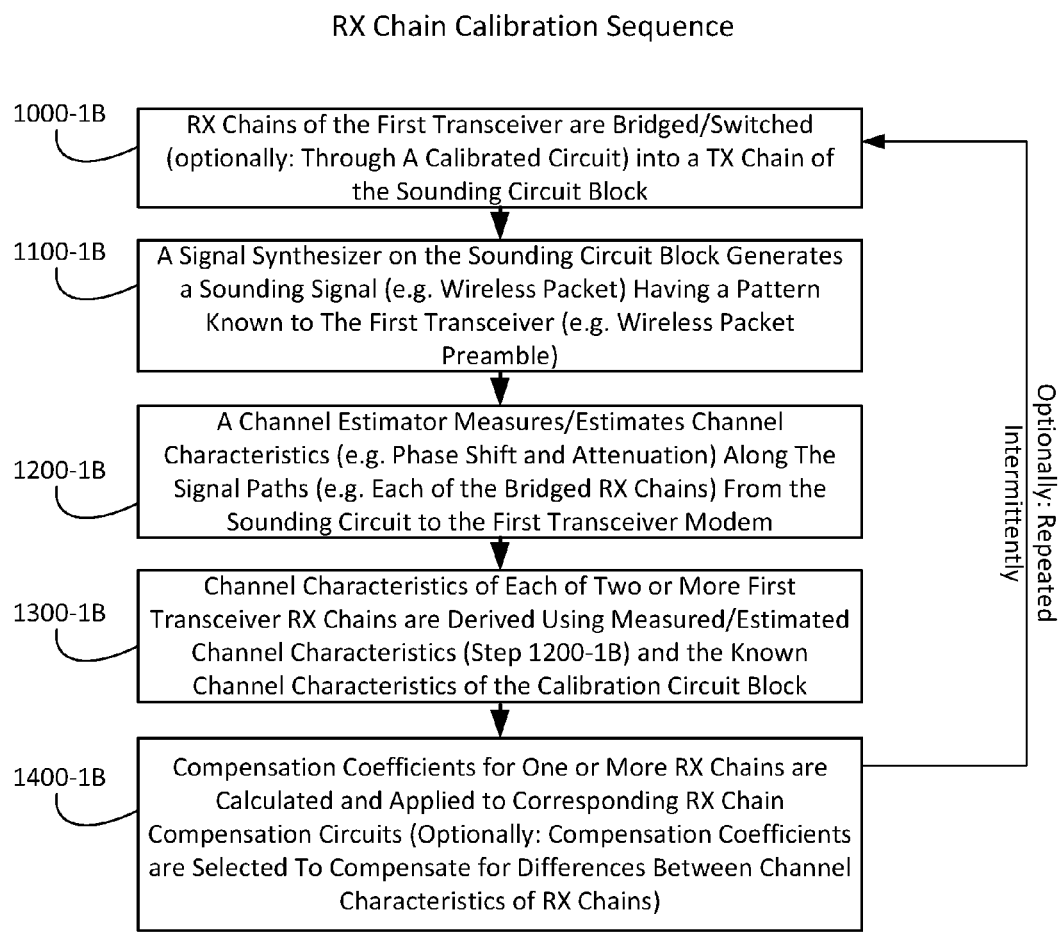
FIG. 1B is shows a flowchart including steps of an exemplary method of estimating channel characteristics of RX chains of communication systems, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, general purpose or dedicated processor, controller, control logic, application specific integrated circuit ("ASIC"), field programmable gate array, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. These apparatuses may be specially constructed for the desired purposes, or may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVDs, magnetic-optical disks, read-only memories (ROMs), random access memories (RAMs) electrically programmable/erasable read-only memories (EPROMs, EEPROMs, NROMs, FLASH, SONOS, etc.), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It should be understood that some embodiments of the present invention may be used in a variety of applications. Although embodiments of the invention are not limited in this respect, one or more of the methods, devices and/or systems disclosed herein may be used in many applications, e.g., civil applications, military applications or any other suitable application. In some demonstrative embodiments the methods, devices and/or systems disclosed herein may be used in the field of computer networking, wireless computer networking, Personal Computers (PC), for example, as part of any suitable desktop PC, notebook PC, monitor, and/or PC accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Turning now to FIG. 1Ai, there is shown a functional block diagram of an exemplary wireless communication system, according to embodiments of the present invention, including: a first wireless transceiver, a calibrated switchable bridging block, a sounding circuit block and calibration control logic which may be wholly discrete or portions of which may be integral with any one of the other constituent components of the system. The embodiment of FIG. 1Ai includes a sounding circuit block having both RX and TX chains, sounding signal sampling and storage circuits and a signal synthesizer. RX/TX chain compensation circuitry is integral with the first transceiver modem. FIG. 1Aii shows a functional block diagram of another exemplary wireless communication system according to embodiments of the present invention where the RX/TX chain compensation circuitry is integral with the first transceiver, between the modem and the RX/TX chains. FIG. 1Aiii is a functional block diagram of yet another exemplary wireless communication system according to embodiments of the present invention where the RX/TX chain compensation circuitry is outside the first transceiver and connected to the RX/TX ports.

Figure 1C:
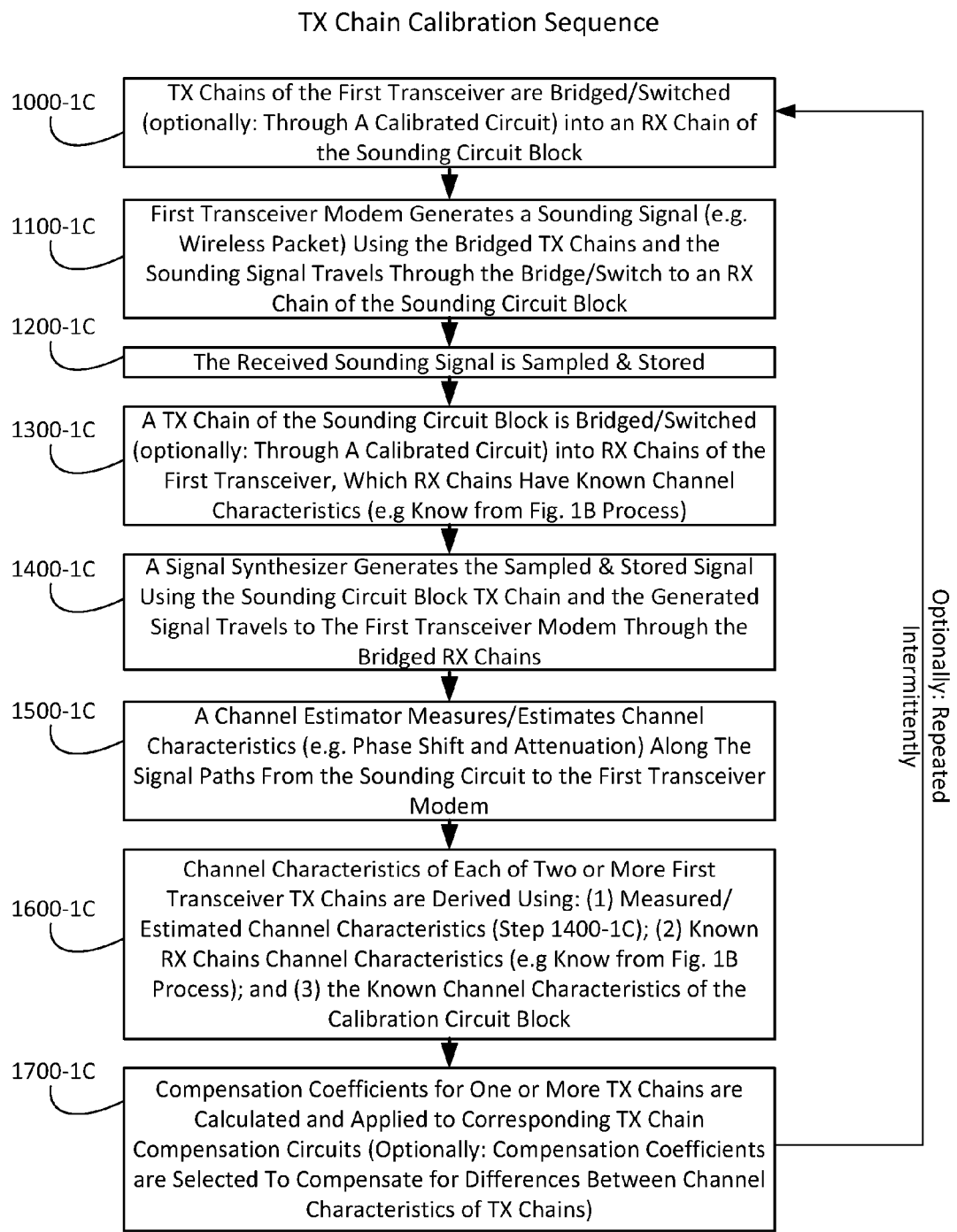
FIG. 1C is shows a flowchart including steps of an exemplary method of estimating channel characteristics of TX chains of communication systems, according to embodiments of the present invention.

Calibration of the RX/TX chains of the systems shown in FIGS. 1Ai through 1Aiii may be described in conjunction with the methods illustrated in the flowcharts of FIGS. 1B and 1C. FIG. 1B shows a flowchart including steps of an exemplary method of estimating channel characteristics of RX chains of communication systems according to embodiments of the present invention. FIG. 1C shows a flowchart including steps of an exemplary method of estimating channel characteristics of TX chains of communication systems according to embodiments of the present invention.

During first transceiver sounding and calibration, the RX chains of the first transceiver are disconnected from the antennas and bridged/switched (optionally: through the Calibrated Circuit) into a TX chain of the sounding circuit block (1000-1B). A signal synthesizer on the sounding circuit block generates a sounding signal (e.g. Wireless Packet) having a pattern known to the first transceiver (e.g. Wireless Packet Preamble) (1100-1B). A channel estimator measures/estimates channel characteristics (e.g. Phase Shift and Attenuation) along the signal paths (e.g. each of the Bridged RX Chains) from the sounding circuit to the first transceiver modem (1200-1B). Channel characteristics of each of two or more first transceiver RX chains are derived using the measured/estimated channel characteristics (Step 1200-1B) and the known channel characteristics of the calibration circuit clock (Step 1300-1B). Compensation coefficients for one or more RX chains are calculated and applied to corresponding RX Chain compensation circuits (Optionally: Compensation Coefficients are selected to compensate for differences between channel characteristics of RX Chains) (1400-1B).

During first transceiver sounding and calibration, TX chains of the first transceiver are bridged/switched (optionally: through A Calibrated Circuit) into an RX chain of the sounding circuit block (1000-1C). The first transceiver modem generates a sounding signal (e.g. Wireless Packet) using the bridged TX chains and the sounding signal travels through the Bridge/Switch to an RX chain of the sounding circuit block (1100-1C). The received sounding signal is sampled and stored (1200-1C). A TX Chain of the sounding circuit block is Bridged/Switched (optionally: through a Calibrated Circuit) into RX chains of the first transceiver, which RX chains have known channel characteristics (e.g known from FIG. 1B Process) (1300-1C). The signal synthesizer generates the sampled and stored signal using the sounding circuit block TX Chain and the generated signal travels to the first transceiver modem through the bridged RX chains (1400-1C). A channel estimator measures/estimates channel characteristics (e.g. Phase Shift and Attenuation) along the signal paths from the sounding circuit to the first transceiver modem (1500-1C). Channel characteristics of each of two or more first transceiver TX chains are derived using: (1) measured/estimated channel characteristics (Step 1400-1C); (2) known RX chains channel characteristics (e.g known from FIG. 1B Process); and (3) the known channel characteristics of the calibration circuit block (1600-1C). Compensation coefficients for one or more TX chains are calculated and applied to corresponding TX chain compensation circuits (Optionally: Compensation Coefficients are selected to compensate for differences between channel characteristics of TX Chains) (1700-1C).

Turning now to FIG. 2Ai, there is shown a functional block diagram of an exemplary wireless communication system according to embodiments of the present invention, including: a first wireless transceiver, a calibrated switchable bridging block, a sounding circuit block and calibration control logic which may be wholly discrete or portions of which may be integral with any one of the other constituent components of the system. The embodiment of FIG. 2Ai includes a sounding circuit block having a second wireless transceiver with both RX and TX chains and a wireless modem having channel estimation circuits. RX/TX chain compensation circuitry is integral with the first transceiver modem. RX/TX chain compensation circuitry is integral with the first transceiver modem. FIG. 2Aii shows a functional block diagram of another exemplary wireless communication system according to embodiments of the present invention where the RX/TX chain compensation circuitry is integral with the first transceiver, between the modem and the RX/TX chains. FIG. 2Aiii is a functional block diagram of yet another exemplary wireless communication system according to embodiments of the present invention, where the RX/TX chain compensation circuitry is outside the first transceiver and connected to the RX/TX ports.

Figure 2B:
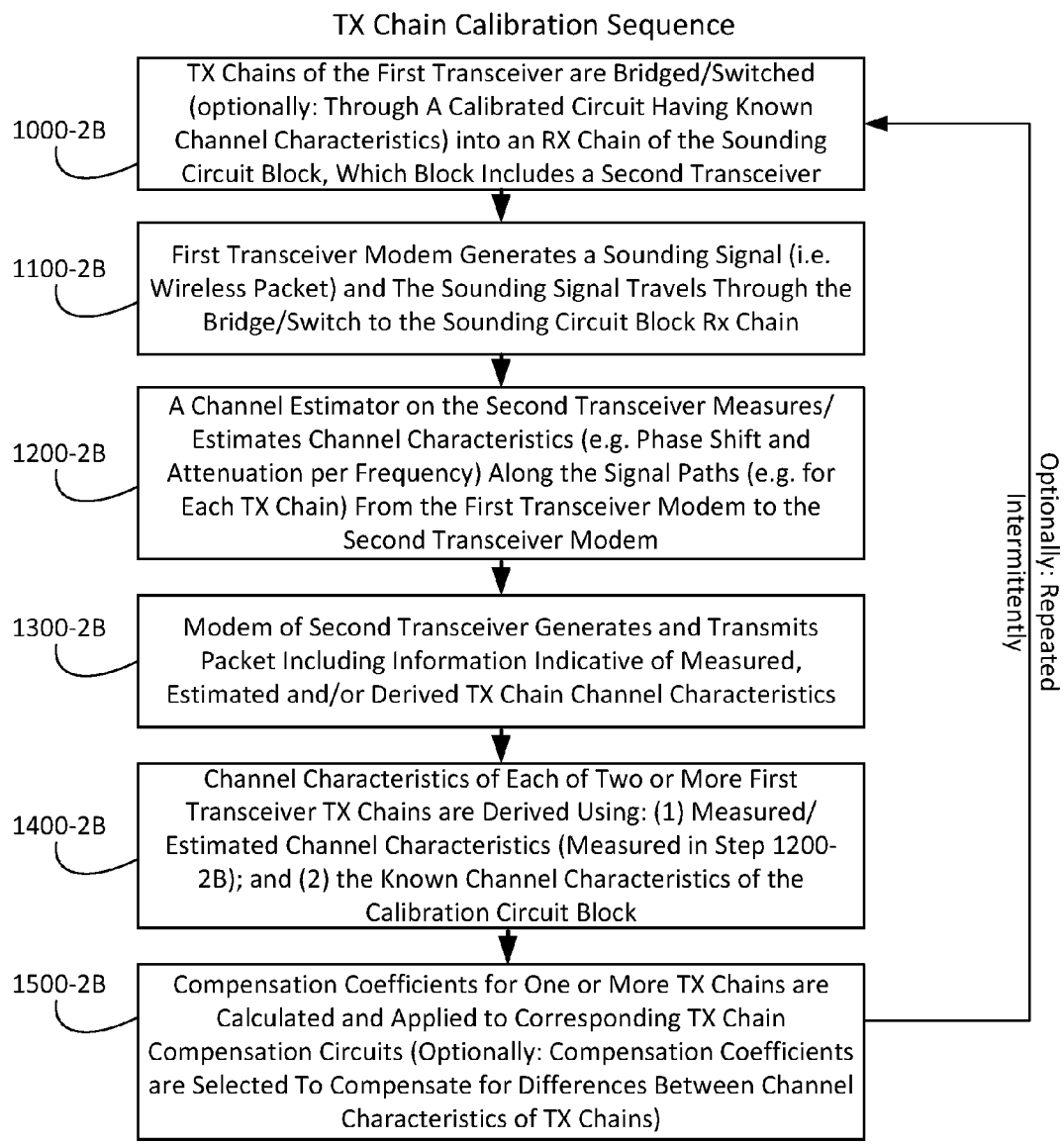
FIG. 2B shows a flowchart including steps of an exemplary method of estimating channel characteristics of RX chains of communication systems, according to embodiments of the present invention.
Figure 2C:
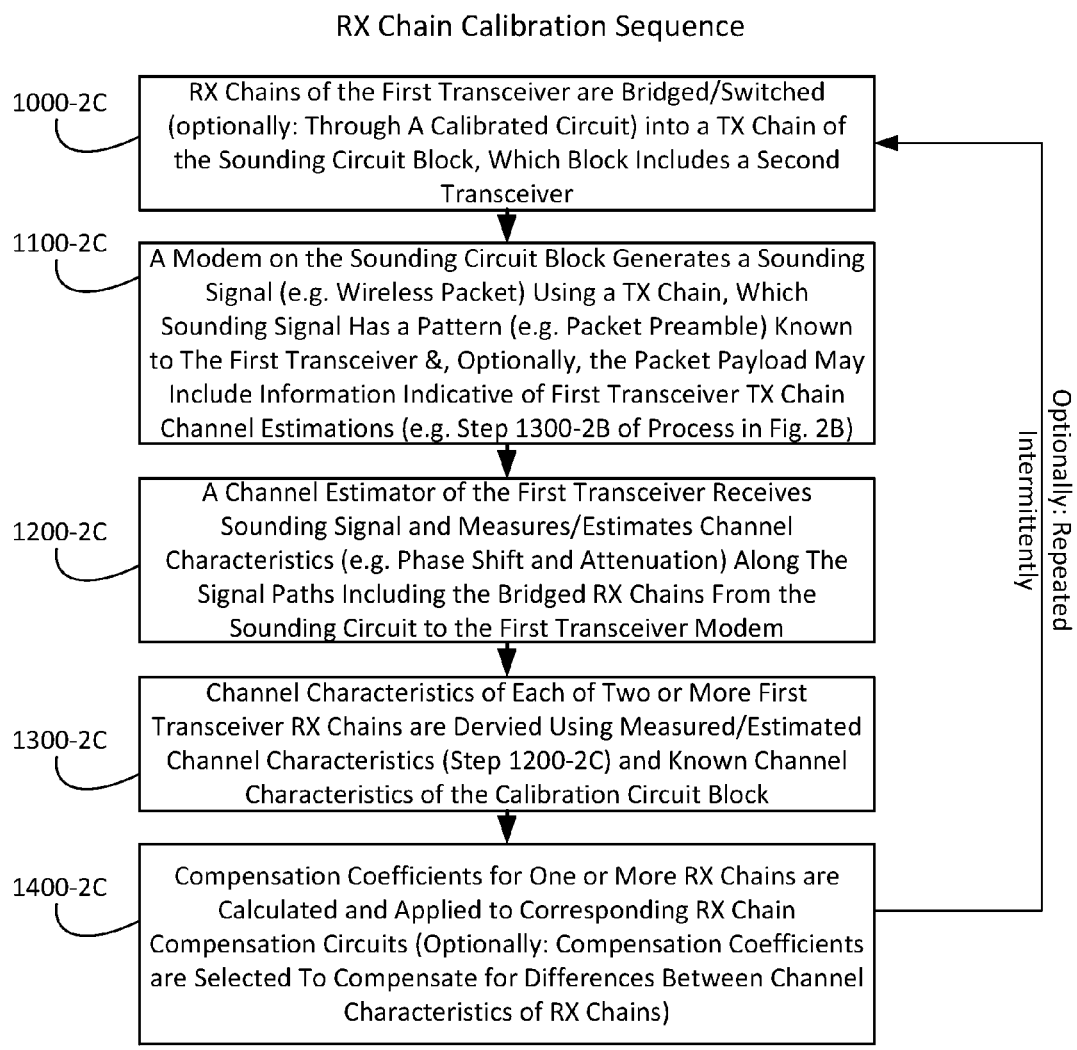
FIG. 2C shows a flowchart including steps of an exemplary method of estimating channel characteristics of TX chains of communication systems, according to embodiments of the present invention.

Calibration of the RX/TX chains of the systems shown in FIGS. 2Ai through 2Aiii may be described in conjunction with the methods illustrated in the flowcharts of FIGS. 2B and 2C. FIG. 2B shows a flowchart including steps of an exemplary method of estimating channel characteristics of TX chains of communication systems according to embodiments of the present invention. FIG. 2C shows a flowchart including the steps of an exemplary method of estimating channel characteristics of RX chains of communication systems according to embodiments of the present invention.

During first transceiver sounding and calibration, TX Chains of the first transceiver are bridged/switched (optionally: through a calibrated circuit having known channel characteristics) into an RX Chain of the sounding circuit block, which block includes a second transceiver (1000-2B). The first transceiver modem generates a sounding signal (i.e. Wireless Packet) and the sounding signal travels through the bridge/switch to the sounding circuit block Rx Chain (1100-2B). A Channel estimator on the second transceiver measures/estimates channel characteristics (e.g. phase shift and attenuation per frequency) along the signal paths (e.g. for each TX Chain) from the first transceiver modem to the second transceiver modem (1200-2B). The modem of the second transceiver generates and transmits a packet including information indicative of measured, estimated and/or derived TX Chain channel characteristics (1300-2B). Channel characteristics of each of two or more first transceiver TX chains are derived using: (1) measured/estimated channel characteristics (measured in Step 1200-2B); and (2) the known channel characteristics of the Calibration Circuit Block (1400-2B). Compensation coefficients for one or more TX chains are calculated and applied to corresponding TX chain compensation circuits (Optionally: Compensation Coefficients are selected to compensate for differences between channel characteristics of TX Chains) (1500-2B).

During first transceiver sounding and calibration, RX Chains of the first transceiver are bridged/switched (optionally: through a calibrated circuit) into a TX chain of the sounding circuit block, which block includes a second transceiver (1000-2C). A Modem on the sounding circuit block generates a sounding signal (e.g. Wireless Packet) using the sounding circuit block TX Chain, which sounding signal has a pattern (e.g. Packet Preamble) known to the first transceiver (Optionally: the packet payload may include information indicative of First Transceiver TX Chain Channel estimations (e.g. step 1300-2B of the process in FIG. 2B)) (1100-2C). A Channel estimator of the first transceiver receives the sounding signal and measures/estimates channel characteristics (e.g. phase shift and attenuation) along the signal paths including the bridged RX chains from the sounding circuit to the first transceiver modem (1200-2C). Channel characteristics of each of two or more first transceiver RX chains are derived using measured/estimated channel characteristics (Step 1200-2B) and known channel Characteristics of the Calibration Circuit Block (1300-2C). Compensation coefficients for one or more RX chains are calculated and applied to corresponding RX chain compensation circuits (Optionally: Compensation Coefficients are selected to compensate for differences between channel characteristics of RX Chains) (1400-2C).

Figure 3:
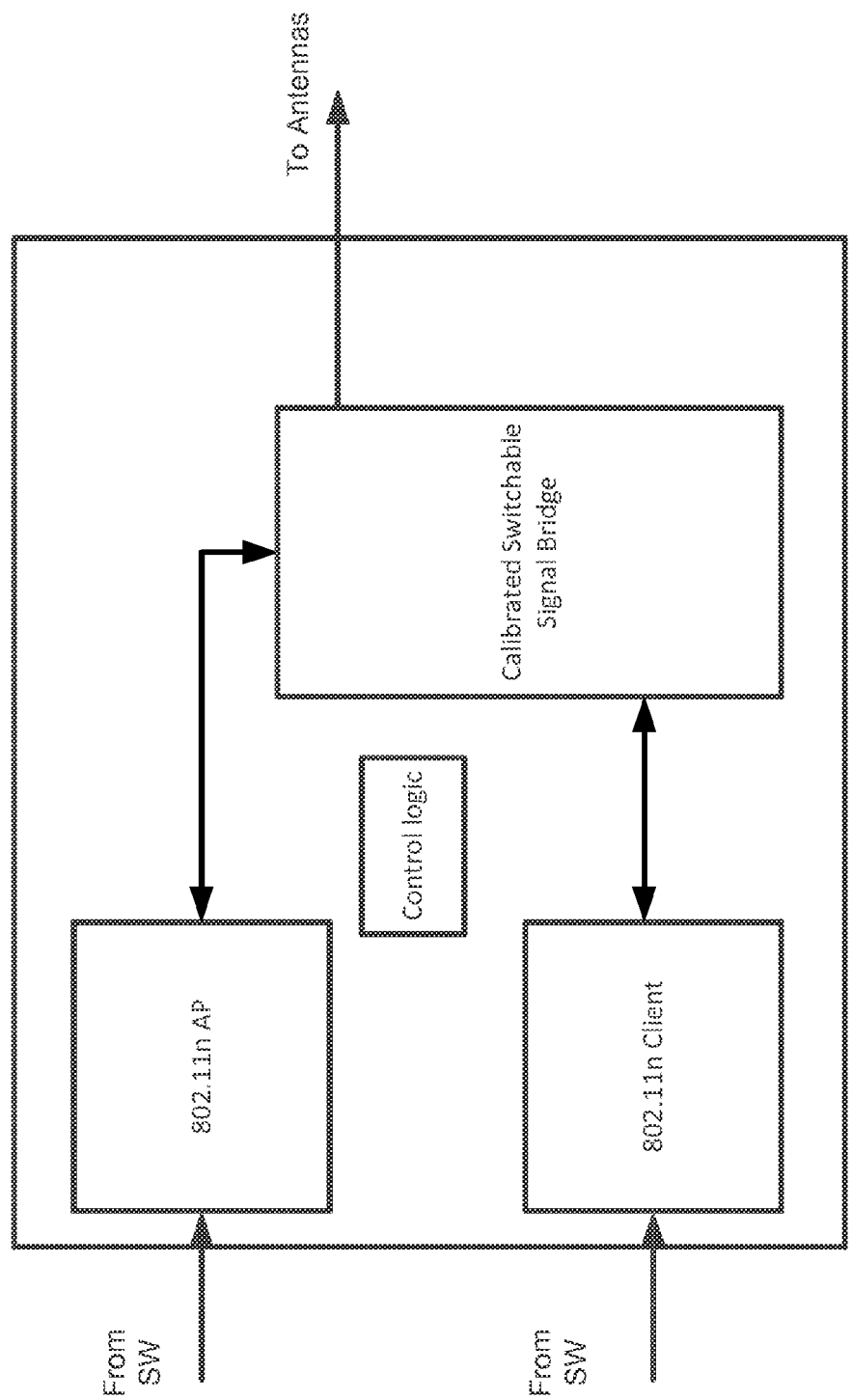
FIG. 3 is a functional block diagram of a specific embodiment of the present invention utilizing Wi-Fi transceivers to form a Wi-Fi Access Point.

Turning now to FIG. 3, there is shown a functional block diagram of a specific embodiment of the present invention utilizing Wi-Fi transceivers to form a Wi-Fi Access Point (APT). According to some embodiments, a transfer function, channel characteristics or transmission characteristics (e.g. channels) of one or more transmission (TX) chains of an APT may be assessed from feedback provided by one or more functionally associated wireless client transceivers. The functionally associated wireless client transceivers may be communicatively coupled to the one or more TX chains through calibrated circuitry having either known or controllable signal transfer characteristics (e.g. channel). The functionally associated wireless client transceiver may include channel estimation circuitry. The functionally associated wireless client transceiver may include a wireless packet generator. Feedback from the wireless client transceiver may be conveyed to the APT within a payload of one or more wireless data packets generated by the wireless client transceiver.

According to further embodiments, (non-ideal) transfer functions or characteristics of one or more APT transmit chains may be compensated for by applying a complex multiplication, either to subcarriers of the APT transmission or to a complete APT OFDM transmission signal. Optionally, the complex multiplication may be a complex scalar multiplication. Complex multiplication(s) factors used may be based on the feedback from the wireless client transceiver circuit functionally associated with the APT. According to yet further embodiments, deviations between channel characteristics of one or more transmit (TX) chain elements of the APT may be assessed and compensated for using feedback from the wireless client transceiver circuit functionally associated with the APT. According to yet further embodiments, one or more transmit (TX) chain elements of an APT may be tuned, adjusted or compensated for based on feedback from the wireless client transceiver circuit functionally associated with the APT.

According to some embodiments, the wireless client transceiver may be co-located or may reside in proximity with the APT, such that the RX chain inputs (RX antenna) of the wireless client transceiver may be communicatively coupled (e.g. connected) to the TX chain outputs (TX Antenna) of the APT. According to further embodiments, transfer functions/characteristics (e.g. channel) between the APT TX antennas and the wireless client RX antenna may be known and/or adjustable, for example using a calibrated circuit.

According to further embodiments, the wireless client transceiver may include one or more channel estimation circuits adapted to measure, calculate, determine, derive or otherwise estimate channels (e.g. H matrix) between each transmit antenna of the APT to each receive antenna of the wireless client transceiver, hereinafter referred to as channel estimations. Channel estimations may be per subcarrier of the APT OFDM transmission or may be an estimation of the complete OFDM transmission, optionally in the time domain, according to further embodiments.

According to some embodiments, APT to wireless client Channel estimate information measured, determined, calculated or otherwise derived at the wireless client transceiver may be provided to a TX chain control circuit integral or otherwise functionally associated with the APT. The channel estimate information may be conveyed by the wireless client transceiver to the APT TX chain control circuit, either directly-through a connection to the APT TX control circuit or via one or more designated/management packets transmitted by the wireless client transceiver to the APT, wherein the channel estimates information is part of the packet(s) payload.

According to some embodiments of the present invention, the TX chain control circuit use the wireless client Channel estimate information either: (1) to adjust one or more elements of the APT TX chain; or (2) by applying a complex multiplication, either to subcarriers of the APT transmission or to a complete APT OFDM transmission signal using a complex scalar multiplication—wherein the complex multiplication(s) factors may be based on feedback from a wireless client transceiver circuit functionally associated with the APT.

According to some embodiments, the TX chain control circuit, or another circuit functionally associated with the TX chain control circuit, may estimate the TX chain channels by comparing the channels measured at the wireless client transceiver against the known channels between the APT output and the Wireless client input (e.g. defined by the calibrated circuit). The estimated TX chain channels may be used to calibrate the APT, either by adjusting TX chain elements or by applying calibrating transform (i.e. complex multiplication) to one or more signals output from the TX chain.

Channel estimation of the APT RX/TX chains, in accordance with some embodiments of the present invention, may be explained as follows:

The switch mode is set to connect the AP and the client. Now the AP initiates a packet with preamble designed to allow for channel estimation. The preamble consists of a known signal that allow for channel estimation from each TX antenna to each receive antenna of the client. 802.11n preamble is one example of such preamble.

Let $s_{Tx\_i}$ be the TX signal from ith antenna not including the RF chain contribution which is measured.

The received signal is given as $$r_{cl} = \left(\sum_{i=1}^{m} s_{Tx\_i} h_{tx\_i} \cdot w_i\right) \cdot h_{Rx} + n$$

where m is the number of AP antennas, i is the chain index. $h_{tx\_i}$ is the desired channel coefficient in the AP TX chain, $h_{Rx}$ is the contribution of the RX chain and $w_i$ is known contribution of the calibrated circuit.

For example the coefficients $w_i$ are all ones i.e., $w_i=1$, m=3 and $$h_{tx\_i} = e^{j20 \cdot i \cdot \frac{\pi}{180}}$$

The channel estimate of the ith channel of the ith TX chain is $x_i = h_{Rx} \cdot h_{tx\_i} \cdot w_i$.

Multiply $x_i$ by the known coefficient $w^*_i \cdot |w_i|^{-1}$ hence, the desired coefficient is estimated as $x_i \cdot w^*_i \cdot |w_i|^{-1} = h_{Rx} \cdot h_{tx\_i}$ Now we would like to know the delta between all the TX chains to the first chain, hence, we multiply each with the complex conjugate of the first TX chain as $$c_i = x_i \cdot w^*_i \cdot |w_i|^{-1} \cdot (h_{Rx} \cdot h_{tx\_1})^* \cdot |h_{Rx} \cdot h_{tx\_1}|^{-1} = h_{tx\_i} \cdot h^*_{tx\_1} \cdot |h^*_{tx\_1}|^{-1}$$

Hence, the $c_i$ are the compensation complex factors for each TX chain.

These channel estimation formulas, along with other channel estimation formulas applicable to wireless communication systems in accordance with the present invention, are further described in Digital Communications by John G Proakis Published by McGraw-Hill Science/Engineering/Math; 5th edition (Nov. 6, 2007), which is hereby incorporated by reference in its entirety.

The same or similar calculations are applicable to the RX chain channel estimations.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A wireless communication system comprising:
one or more antenna elements;
a first wireless transceiver comprising: (a) a modem, and (b) one or more Radio Frequency (RF) chain pairs, wherein at least one RF chain pair includes: (i) a receive chain (RX), and (ii) a transmit chain (TX);
a sounding circuit block comprising: (a) a receive chain (RX), (b) a transmit chain (TX); and control circuitry adapted to coordinate: (1) reception of sounding signals from said first wireless transceiver, and (2) transmission of sounding signals to said first wireless transceiver; and
a calibrated switchable bridging block (CSBB) switchably coupling signals between said first transceivers and said sounding circuit block, said CSBB comprising: a controllable signal switch having known channel characteristics between ports of said switch.

2. The wireless communication system according to claim 1, further comprising calibration control logic adapted to regulate signal flow through said CSBB during a sounding sequence of said first wireless transceiver and to apply compensation coefficients to RF compensation circuits functionally associated with said first wireless transceiver RF chain pairs.

3. The wireless communication system according to claim 2, wherein said sounding circuit block includes a second wireless transceiver comprising a second transceiver modem.

4. The wireless transmission system according to claim 3, wherein said calibration control logic is adapted to initiate a TX chain sounding sequence during which: (1) at least one of said first transceiver TX chains is communicatively coupled through said CSBB to the RX chain of said second wireless transceiver; (2) said modem and communicatively coupled TX chains of said first transceiver generate a sounding signal; (3) the coupled RX chain of said second transceiver receives the generated sounding signal; and (4) a channel estimator of said second transceiver modem analyzes the received sounding signal to estimate a channel characteristic of at least a portion of signal paths, including the first transceiver TX chains, between said first transceiver modem and said second transceiver modem.

5. The wireless transmission system according to claim 4, wherein said calibration control logic is adapted to perform TX chain calibration by: (1) calculating TX chain compensation coefficients at least partially based on channel characteristics estimated during the TX chain sounding sequence; and (2) applying the TX chain compensation coefficients to compensation circuits functionally associated with said first transceiver TX chains.

6. The wireless transmission system according to claim 3, wherein said calibration control logic is adapted to initiate a RX chain sounding sequence during which: (1) at least one of said first transceiver RX chains is communicatively coupled through said CSBB to the TX chain of said second wireless transceiver; (2) said modem and communicatively coupled TX chain of said second transceiver generate a sounding signal; (3) the coupled RX chains of said first transceiver receive the generated sounding signal; and (4) a channel estimator of said first transceiver modem analyzes the received sounding signal to estimate a channel characteristic of at least a portion of signal paths, including the first transceiver RX chains, between said second transceiver modem and said first transceiver modem.

7. The wireless transmission system according to claim 6, wherein said calibration control logic is adapted to perform RX chain calibration by: (1) calculating RX chain compensation coefficients at least partially based on channel characteristics estimated during the RX chain sounding sequence; and (2) applying the RX chain compensation coefficients to compensation circuits functionally associated with said first transceiver RX chains.

8. The wireless transmission system according to claim 6, wherein the sounding signal generated by said modem and communicatively coupled TX chain of said second transceiver is a wireless packet with a known signal pattern.

9. The wireless transmission system according to claim 8, wherein the wireless packet includes a payload with estimated channel characteristic of at least a portion of signal paths, including the first transceiver TX chains, between said first transceiver modem and said second transceiver modem.

10. The wireless communication system according to claim 2, wherein said sounding circuit block comprises signal sampling and storage circuits and a signal synthesizer.

11. The wireless transmission system according to claim 10, wherein said calibration control logic is adapted to initiate a RX chain sounding sequence during which: (1) at least one of said first transceiver RX chains is communicatively coupled through said CSBB to the TX chain of said sounding circuit block; (2) a synthesizer and communicatively coupled TX chain of said signal sounding block generate a sounding signal including a known pattern; (3) the coupled RX chains of said first transceiver receive the generated sounding signal; and (4) a channel estimator of said first transceiver modem analyzes the received sounding signal to estimate a channel characteristic of at least a portion of signal paths, including the first transceiver RX chains, between the signal sounding block synthesizer and said first transceiver modem.

12. The wireless transmission system according to claim 11, wherein said calibration control logic is adapted to perform RX chain calibration by: (1) calculating RX chain compensation coefficients at least partially based on channel characteristics estimated during the RX chain sounding sequence; and (2) applying the RX chain compensation coefficients to compensation circuits functionally associated with said first transceiver RX chains.

13. The wireless transmission system according to claim 10, wherein said calibration control logic is adapted to initiate a TX chain sounding sequence during which: (1) at least one of said first transceiver TX chains is communicatively coupled through said CSBB to the RX chain of said sounding circuit block; (2) said modem and communicatively coupled TX chains of said first transceiver generate a sounding signal; (3) the coupled RX chain of said sounding circuit block receives the generated sounding signal; (4) the received sounding signal is sampled and stored by a signal sampling and storage block; (5) upon the TX chain of said sounding circuit being bridged into RX chains of said first wireless transceiver, a signal synthesizer generates and transmits the stored sounding signal back to said first wireless transceiver; and (6) a channel estimator of said first transceiver modem analyzes the received sounding signal to estimate a channel characteristic of at least a portion of signal paths, including the first transceiver TX chains, between said first transceiver modem and said second transceiver modem.

14. The wireless transmission system according to claim 13, wherein said calibration control logic is adapted to perform TX chain calibration by: (1) calculating TX chain compensation coefficients at least partially based on channel characteristics estimated during the TX chain sounding sequence; and (2) applying the TX chain compensation coefficients to compensation circuits functionally associated with said first transceiver TX chains.

15. The wireless transmission system according to claim 14, wherein calculating TX chain compensation coefficients at least partially based on channel characteristics estimated during the TX chain sounding sequence also includes factoring channel characteristics estimated during the RX chain sounding sequence.

16. A method for calibrating a wireless communication system comprising:

switchably coupling signals between a first wireless transceiver and a sounding circuit block through a calibrated signal switch having known channel characteristics between ports of the switch;

generating sounding signals at the first wireless transceiver and at the sounding circuit block;

transmitting the sounding signals in both directions between the sounding circuit block and the first transceiver; and generating compensation coefficients based on channel estimations performed on received sounding signals.

17. The method according to claim 16, wherein a TX chain sounding sequence includes: (1) at least one of the first transceiver TX chains being communicatively coupled through a calibrated switchable bridging block (CSBB) to the RX chain of a second wireless transceiver on the sounding circuit block; (2) a modem and communicatively coupled TX chains of the first transceiver generating a sounding signal; (3) the coupled RX chain of the second transceiver receiving the generated sounding signal; and (4) a channel estimator of the second transceiver analyzing the received sounding signal to estimate a channel characteristic of at least a portion of signal paths, including the first transceiver TX chains, between said transceiver and said second transceiver.

18. The method according to claim 17, wherein TX chain calibration includes: (1) calculating TX chain compensation coefficients at least partially based on channel characteristics estimated during the TX chain sounding sequence; and (2) applying the TX chain compensation coefficients to compensation circuits functionally associated with said first transceiver TX chains.

19. The method according to claim 16, wherein RX chain sounding sequence includes: (1) at least one of said first transceiver RX chains being communicatively coupled through a calibrated switchable bridging block (CSBB) to the TX chain of said second wireless transceiver; (2) said modem and communicatively coupled TX chain of said second transceiver generating a sounding signal; (3) the coupled RX chains of said first transceiver receiving the generated sounding signal; and (4) a channel estimator of said first transceiver analyzing the received sounding signal to estimate a channel characteristic of at least a portion of signal paths, including the first transceiver RX chains, between said second transceiver modem and said first transceiver modem.

20. The method according to claim 19, wherein RX chain calibration includes: (1) calculating RX chain compensation coefficients at least partially based on channel characteristics estimated during the RX chain sounding sequence; and (2) applying the RX chain compensation coefficients to compensation circuits functionally associated with said first transceiver RX chains.

21. The method according to claim 16, wherein a RX chain sounding sequence includes: (1) at least one of said first transceiver RX chains being communicatively coupled through a calibrated switchable bridging block (CSBB) to the TX chain of said sounding circuit block; (2) a synthesizer and communicatively coupled TX chain of said signal sounding block generating a sounding signal including a known pattern; (3) the coupled RX chains of said first transceiver receiving the generated sounding signal; and (4) a channel estimator of said first transceiver analyzing the received sounding signal to estimate a channel characteristic of at least a portion of signal paths, including the first transceiver RX chains, between the signal sounding block synthesizer and said first transceiver modem.

22. The method according to claim 21, wherein RX chain calibration includes: (1) calculating RX chain compensation coefficients at least partially based on channel characteristics estimated during the RX chain sounding sequence; and (2) applying the RX chain compensation coefficients to compensation circuits functionally associated with said first transceiver RX chains.

23. The method according to claim 16, wherein a TX chain sounding sequence includes: (1) at least one of said first transceiver TX chains being communicatively coupled through a calibrated switchable bridging block (CSBB) to the RX chain of said sounding circuit block; (2) said modem and communicatively coupled TX chains of said first transceiver generating a sounding signal; (3) the coupled RX chain of said sounding circuit block receiving the generated sounding signal; (4) the received sounding signal being sampled and stored by a signal sampling and storage block; (5) upon the TX chain of said sounding circuit being bridged into RX chains of said first wireless transceiver, a signal synthesizer generating and transmitting the stored sounding signal back to said first wireless transceiver; and (6) a channel estimator of said first transceiver analyzing the received sounding signal to estimate a channel characteristic of at least a portion of signal paths, including the first transceiver TX chains, between said first transceiver modem and said second transceiver modem.

24. The method according to claim 23, wherein TX chain calibration includes: (1) calculating TX chain compensation coefficients at least partially based on channel characteristics estimated during the TX chain sounding sequence; and (2) applying the TX chain compensation coefficients to compensation circuits functionally associated with said first transceiver TX chains.

25. A method for calibrating a wireless communication system comprising:
receiving a first sounding signal generated by a first wireless transceiver at a second wireless transceiver, both of which are integrated within said wireless communication system;
receiving a second sounding signal generated by the second wireless transceiver at the first wireless transceiver, wherein a payload of the second sounding signal includes channel estimations derived from the first sounding signal, thereby proving the first transceiver with channel estimates performed by the second transceiver; and
generating compensation coefficients based on channel estimations performed on the second sounding signal and factoring channel estimations performed of the first sounding signal.

* * * * *